United States Patent [19]

Aguet

[11] 3,919,839

[45] Nov. 18, 1975

[54] COMBUSTION GAS TURBINE/STEAM GENERATOR PLANT

[75] Inventor: Emile Aguet, Winterthur, Switzerland

[73] Assignee: Sulzer Brothers Ltd., Winterthur, Switzerland

[22] Filed: Sept. 24, 1974

[21] Appl. No.: 508,865

[30] Foreign Application Priority Data
Oct. 2, 1973 Switzerland.................. 14081/73

[52] U.S. Cl............... 60/39.18 B; 122/7 R; 60/676
[51] Int. Cl.².................. F02C 7/00; F01K 13/00
[58] Field of Search . 60/39.18 R, 39.18 A, 39.18 B, 60/39.05, 39.53, 618, 670, 676; 122/7 R

[56] References Cited
UNITED STATES PATENTS
3,194,015  7/1965  Pacault.......................... 60/39.18 B
3,208,832  9/1965  Blaskowski.................... 122/7 R
3,314,231  4/1967  Hochmuth..................... 122/7 R

*Primary Examiner*—C. J. Husar
*Assistant Examiner*—L. T. Casaregola
*Attorney, Agent, or Firm*—Kenyon & Kenyon Reilly Carr & Chapin

[57] ABSTRACT

A fired steam generator is interconnected with a gas turbine/steam generator plant having at least one gas turbine group followed by an exhaust-gas steam generator. The exhaust-gas steam generator has a preheater and an evaporator. The inlet of the preheater is connected to a feedwater distribution line which also feeds a preheater in the fired steam generator. The outlet of the preheater is connected to the evaporator of the fired steam generator. The evaporator outlet of the exhaust-gas steam generator is connected to the input of a superheater in the fired steam generator.

7 Claims, 1 Drawing Figure

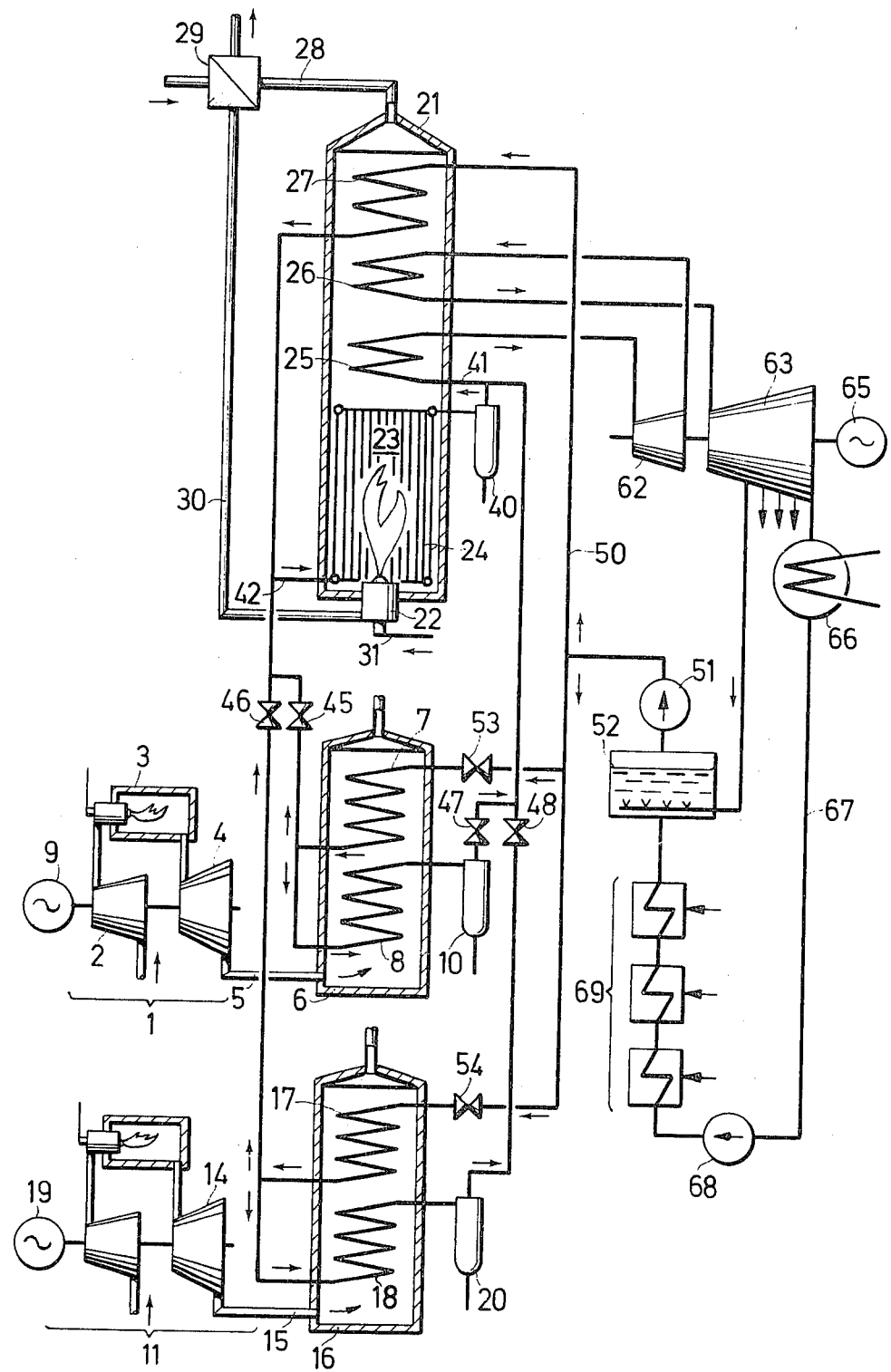

COMBUSTION GAS TURBINE/STEAM GENERATOR PLANT

This invention relates to a combination gas turbine/steam generator plant.

Combined gas turbine/steam generator plants have been known to have at least one gas turbine group consisting of a compressor, combustion chamber and gas turbine, followed by an exhaust-gas steam generator provided with a feed-water preheater and an evaporator. Generally, these plants, as compared with steam-power plants without a gas turbine, have the advantage of greater efficiency as well as of lower installation costs. However, despite this advantage, combination plants have not come into general use. The reason for this may be that the reliability of the operation of gas-turbine plants is still not as good as that of conventional steampower plants. Thus, the combination plants have a greater risk of derangment.

Accordingly, it is an object of the invention to improve combination plants of the type mentioned at the outset in such a way that the risk of derangements is substantially diminished.

It is another object of the invention to provide a combination gas turbine/steam generator plant which is of relatively simple construction.

Briefly, the invention provides a combination gas turbine/steam power plant having at least one gas turbine group and an exhaust-gas steam generator including a feedwater preheater and an evaporator with a fired steam generator.

The gas turbine group includes a compressor, combustion chamber and gas turbine which are interconnected to produce a flow of exhaust gas.

The exhaust-gas steam generator is connected to the gas turbine to receive the flow of exhaust gas. The preheater is disposed to preheat a flow of feedwater delivered from a suitable source while the evaporator is connected to the preheater to vaporize a flow of preheated feedwater therefrom.

The fired steam generator has an evaporator and a superheater therein. The evaporator is connected to the preheater of the exhaust-gas steam generator to receive a flow of preheated feed water while the superheater is connected to the evaporator of the exhaust-gas steam generator and to the evaporator of the fired steam generator to receive steam from each.

During operation, when the exhaust gas steam generator is in operation, the evaporator of the fired steam generator is supplied with feed water at least from the preheater of the exhaust-gas steam generator and the superheater is supplied with steam from the evaporator of the exhaust-gas steam generator and also with steam from the evaporator of the fired steam generator.

By providing an additional steam-generator, whose superheater takes all the amount of steam produced in all evaporators of the plant, and whose evaporator moreover is supplied with a part of the feed water preheated in the preheaters of the exhaust-gas steam generator, it is possible to combine the known advantages, of the known higher efficiency and lower cost of installation, with the advantage of a substantially diminished risk of derangement. In the event of derangement of a gas-turbine group, and thus of the associated exhaust-gas steam generator, the extra fired steam generator can be loaded higher, so that the entire loss of power caused by the derangement of the group has no effect.

It is true that with the greater load on the fired steam generator, the exhaust gas temperature in the chimney or stack of the plant rises and that this somewhat impairs the overall efficiency of the plant. However, this can easily be tolerated in view of the decreased risk of derangement.

A further advantage of the plant of the invention resides in that in normal operation, that is when the fired steam generator and the exhaust-gas steam generator or generators are in operation, the amount of heat to be conducted away in a condenser of the steam turbine amounts to only about 40% of the total heat to be conducted away of the fuel. The condenser can thus be made smaller. Also, the cooling water consumption of the condenser is substantially less than with conventional steam power plants.

These and other objects and advantages of the invention will become more apparent from the following detailed description and appended claims taken in conjunction with the accompanying drawing in which:

The drawing illustrates a schematic view of the circuit of a combination gas turbine/steam power plant according to the invention.

Referring to the drawing, the combination gas turbine/steam power plant has a first gas-turbine group 1, which consists of a compressor 2, a combustion chamber 3 and a gas turbine 4 which are interconnected as is known to produce a flow of exhaust gas. In addition, an exhaust-gas steam generator 6 is connected to the gas turbine 4 over an exhaust-gas conduit 5. The exhaust-gas steam generator 6 comprises a feed-water preheater 7 and also an evaporator 8 for vaporizing a flow of feed water from the preheater 7. The preheater 7 is dimensioned to receive at least twice the quantity of feed water evaporated in the evaporator 8. In addition, the compressor 2 and gas turbine 4 are coupled with an electric generator 9 to produce an amount of electrical power.

The plant is also provided with a second gas-turbine group 11, made and dimensioned similarly to group 1. The gas turbine 14 of the second group 11 is connected by a conduit 15 with an exhaust-gas steam generator 16, which, similarly to the exhaust-gas steam generator 6, has a feed-water preheater 17 and an evaportor 18. The preheater 17, similarly to the preheater 7, is constructed to receive at least twice the quantity of feed water as the evaporator 18.

The plant also has an additional fired steam generator 21, which has a combustion chamber 23 in a lower part with walls which are covered by an evaporator 24. The firing or burner 22 of the steam generator 21 is located at the base of the combustion chamber 23 and receives fuel through a conduit 31 and preheated combustion air through a conduit 30. In addition, a superheater 25, a reheater 26, and a feed-water preheater or economizer 27 follow in the flow of exhaust gas beyond the evaporator 24. A conduit 28 is connected to the outlet for the exhaust gas of the steam generator 21 and runs to an air preheater 29, in which preheating of the combustion air for the burner 22 occurs.

The evaporators 8, 18 and 24, of the three steam generators 6, 16 and 21 are each connected at their steam side over a separator 10, 20 and 40 respectively, with a collector-line 41 which leads to the input of the superheater 25 in the steam generator 21. The superheater 25 thus takes the entire amount of steam produced in all three steam generators 6, 16, 21. A similar collector-line 42 exists for the preheated water, in that the feed-water preheaters 7, 17 and 27, are at their output side connected to the collectorline 42, which leads to the input of the evaporator 24 in the steam generator 21.

The preheaters 7, 17 and 27 are connected at their input side to a distributor line 50, which is connected over a feed-pump 51 to a feed-water tank 52. In this way, the evaporator 24 of the fired steam generator 21 is connected to the preheaters 7, 17 of the exhaust-gas steam generators 6, 16 and the superheater 25 is connected to the evaporators 8, 18. In order to disconnect the evaporator 24 and the superheater 25 from the exhaust-gas steam generators 6, 16, a suitable means is provided in the form of valves. In each case, a valve 53, 54 is provided between the distributor line 50 and the preheaters 7 and 17. Corresponding valves 45 and 46 are installed between the collector-line 42 for the preheated feed-water and the preheaters 7 and 17 and valves 47 and 48 between the collector-line 41 and the separators 10 and 20.

The output of the superheater 25 is connected with the input of a high-pressure stage 62 of a steam turbine. The reheater 26 is interposed between the output of the high-pressure stage 62 and the input of a medium-pressure and low-pressure stage 63 of the steam turbine, which drives an electric generator 65. A condenser 66 is connected to the output of the low-pressure stage which is in communication, over a condensate line 67, with the feed-water tank 52. The condensate line has a condensate pump 68 and a number of steam-heated preheaters 69.

In normal operation of the plant, all three steam generators 6, 16 and 21, operate. The six valves 45, 46, 47, 48, 53 and 54 are opened, and the exhaust gas from the gas turbines 4 and 14 of the groups 1 and 11 flows, with a temperature of approximately 500°C, through the conduits 5 and 15 into the steam generators 6 and 16, respectively. The two preheaters 7 and 17 of the exhaust-gas steam generators 6 and 16 each receive, via the feed-pump 51 over the distributor line 50, a quantity of feed-water which is about three times larger than the quantity of steam produced in the evaporators 8, 18. During the preheating and evaporation of the operative medium, the exhaust gas becomes cooled down to about 180°C, at which temperature the exhaust gas leaves the generators 6, 16. The water, preheated from about 150°C to about 330°C, arrives from the preheaters 7, 17 by about one third into the associated evaporators 8, 18 respectively, while the remainder is conducted through the collector-line 42 to the evaporator 24 of the fired steam generator 21. The quantity of water pumped by the feed-pump 51 and not sent to the exhuast-gas steam generators 6, 16 flows to the economizer 27 of the steam generator 21, and likewise becomes preheated to about 330°C, and then flows to the evaporator 24.

The amount of saturated steam produced in the three evaporators 8, 18 and 24, flows through the collector-line 41 to the superheater 25, and thereafter exits at a pressure of about 180 atmospheres absolute and at 540°C. After a partial expansion in the high-pressure stage 62, the steam is again superheated in the reheater 26, and arrives at about 34 atmospheres absolute and 540°C in the medium-pressure and low-pressure stage 63 of the steam turbine.

The exhaust gas leaves the steam-generator 21 at about 340°C, and flows over the line 28 into the air-preheater 29, in which a cooling down of the exhaust gas occurs to about 140°C, while the air becomes preheated to about 250°C. While the two groups 1 and 11 give off about 83 MW apiece, the power output of the generator 65 driven by the steam turbine is about 283 MW. With the described plant in normal operation an efficiency of about 44% can be obtained.

If, for example, group 1 fails, then the corresponding exhaust-gas steam generator 6 can be switched out, in that the valves 45, 47 and 53, are closed. With the feed-pump 51 pumping the same amount, correspondingly more feedwater now arrives in the economizer 27. Because of the increase in performance of the burner 22, the steam generator 21 is now able to produce a greater amount of steam. As a result, the exhaust-gas temperature behind the air preheater 29 does indeed rise, through which the overall efficiency is somewhat impaired. The loss of performance arising from the failure of the gas turbine group 1 however amounts to only just 20%. Should the second group 11 also fail, which is very improbable, then the plant, with only operation of the fired steam generator 21, could still produce about 50% of its nominal power. Thus, the risk of failure of the described installation is substantially decreased in comparison with a conventional combination plant.

What is claimed is:

1. A combustion gas turbine/steam power plant comprising
    at least one gas turbine group including a compressor, combustion chamber and gas turbine interconnected to produce a flow of exhaust gas;
    an exhaust-gas steam generator connected to said gas turbine to receive the flow of exhaust gas therefrom, said steam generator including a feed-water preheater for preheating a flow of feed water and an evaporator connected to said preheater to vaporize a flow of preheated feed water therefrom; and
    a fired steam generator having an evaporator and a superheater therein, said evaporator of said fired steam generator being connected to said preheater of said exhaust gas steam generator to receive a flow of preheated feed water therefrom, and said superheater of said fired steam generator being connected to said evaporator of said exhaust gas steam generator and to said evaporator of said fired steam generator to receive steam from each.

2. A plant as set forth in claim 1 wherein said preheater of said exhaust-gas steam generator is dimensioned to receive at least twice the feed water evaporated in said evaporator of said exhaust gas-steam generator.

3. A plant as set forth in claim 1 wherein said fired steam generator further includes a preheater for preheating a flow of feed water, and which further comprises a distribution line connected to said preheater of said exhaust-gas steam generator and said preheater of said fired steam generator to deliver feed water to each said preheater.

4. A plant as set forth in claim 1 wherein said fired steam generator is characterized by a firing dimensioned to produce a higher firing performance upon failure of said gas turbine group.

5. A plant as set forth in claim 1 which comprises means for disconnecting said evaporator of said fired steam generator from said preheater of said exhaust-gas steam generator and said superheater of said fired steam generator from said evaporator of said exhaust-gas steam generator.

6. A plant as set forth in claim 1 which comprises a pair of said gas turbine groups and a pair of said exhaust-gas steam generators connected in parallel with said evaporator and said superheater of said fired steam generator.

7. A combustion gas turbine/steam power plant comprising at least one gas turbine group for producing a flow of exhaust gas;

an exhaust-gas steam generator connected to said gas turbine to receive the flow of exhaust gas therefrom, said steam generator including a feed-water preheater for preheating a flow of feed water and an evaporator connected to said preheater to vaporize a flow of preheated feed water therefrom;

a fired steam generator having an evaporator and a superheater therein, said evaporator of said fired steam generator being connected to said preheater of said exhaust-gas steam generator to receive a flow of preheated feed water therefrom, and said superheater of said fired steam generator being connected to said evaporator of said exhaust-gas steam generator and to said evaporator of said fired steam generator to receive steam from each;

a first electric generator connected with said gas turbine group to produce an amount of electrical power; and a second electric generator connected with said fired steam generator to produce a second amount of electrical power.

* * * * *